INVENTORS
Wilbur Mills Page
Frank Edward Crust

United States Patent Office 3,456,990
Patented July 22, 1969

3,456,990
AIR PRESSURE OPERATED BRAKING SYSTEMS
Wilbur M. Page, Lincoln, and Frank E. Crust, Sturton-by-Stow, England, assignors to Clayton Dewandre Company Limited, Lincoln, England
Filed Oct. 13, 1967, Ser. No. 675,242
Claims priority, application Great Britain, Oct. 28, 1966, 48,473/66
Int. Cl. B60t 8/18, 11/02
U.S. Cl. 303—22                                              4 Claims

ABSTRACT OF THE DISCLOSURE

In an air pressure operated vehicle braking system in which the permitted degree of braking is limited by a valve responsive to vehicle load, said valve is actuated through a lever by a control cylinder responsive to the pressure in a suspension unit of the vehicle's air suspension system and an additional cylinder responsive to reservoir pressure acts on the lever fulcrum to set the valve to "maximum braking" in the event of loss of pressure.

This invention relates to air pressure operated braking systems for motor vehicles fitted with air suspension and particularly to braking systems of the kind incorporating a light/laden control valve of the form disclosed in United States application Ser. No. 658,241, filed Aug. 3, 1967 (now abandoned), and the pending continuation-in-part thereof Ser. No. 731,773, filed May 24, 1968, for Load Controlled Braking System, for limiting the permitted degree of braking in accordance with vehicle load.

In United States application Ser. No. 658,240, filed Aug. 3, 1967 (now abandoned), and the pending continuation-in-part thereof Ser. No. 731,773, filed May 24, 1968, for Load Controlled Braking System, there is disclosed a braking system of the above kind in which the light/laden valve is actuated by a control cylinder responsive to the pressure in an air bag or equivalent suspension unit and supported on the end of the light/laden valve housing, additional means being provided operable upon loss of pressure in the air suspension system to render inoperative the balancing piston of the light/laden valve and so ensure that maximum braking pressure is available in spite of a setting of the control cylinder to "light braking" position.

The present invention provides improvements in braking systems of the kind mentioned and in particular provides a novel or improved form of "fail safe" mechanism which is more refined, economical and reliable in operation.

According to the invention in the improved braking system the light/laden valve is actuated through a lever by a control cylinder responsive to pressure in the air suspension system, an additional cylinder unit being provided which is responsive to reservoir pressure and is spring-loaded and which also has operable connection with said lever, the arrangement being such that in the event of loss of pressure in the air suspension system, said additional cylinder unit under action of its loading spring and acting through said lever displaces the fulcrum of the beam within the light/laden valve to counteract the "light" setting of the control cylinder and maintain said valve in the setting for maximum braking pressure.

Figure 1:
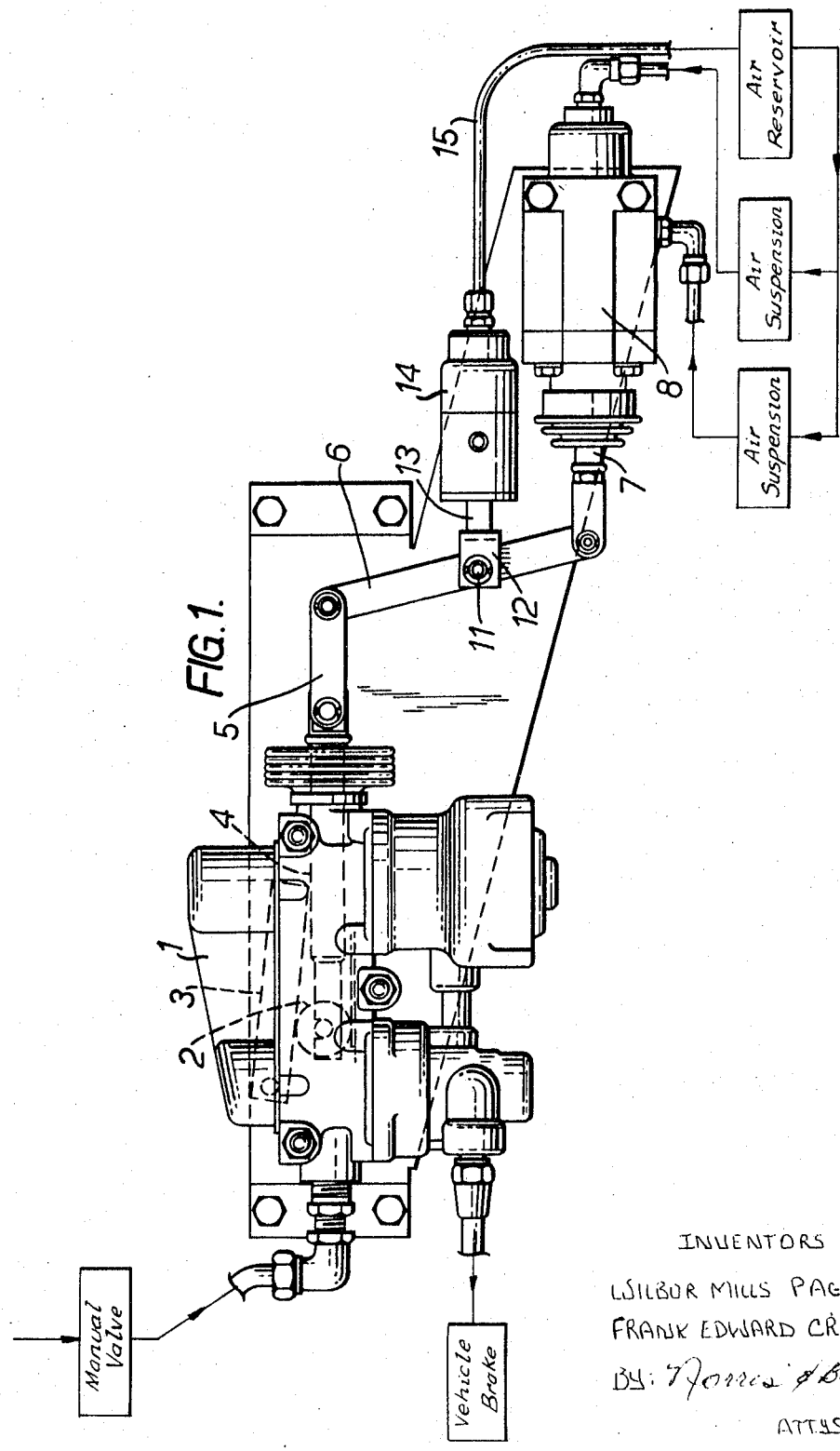
Figure 2:
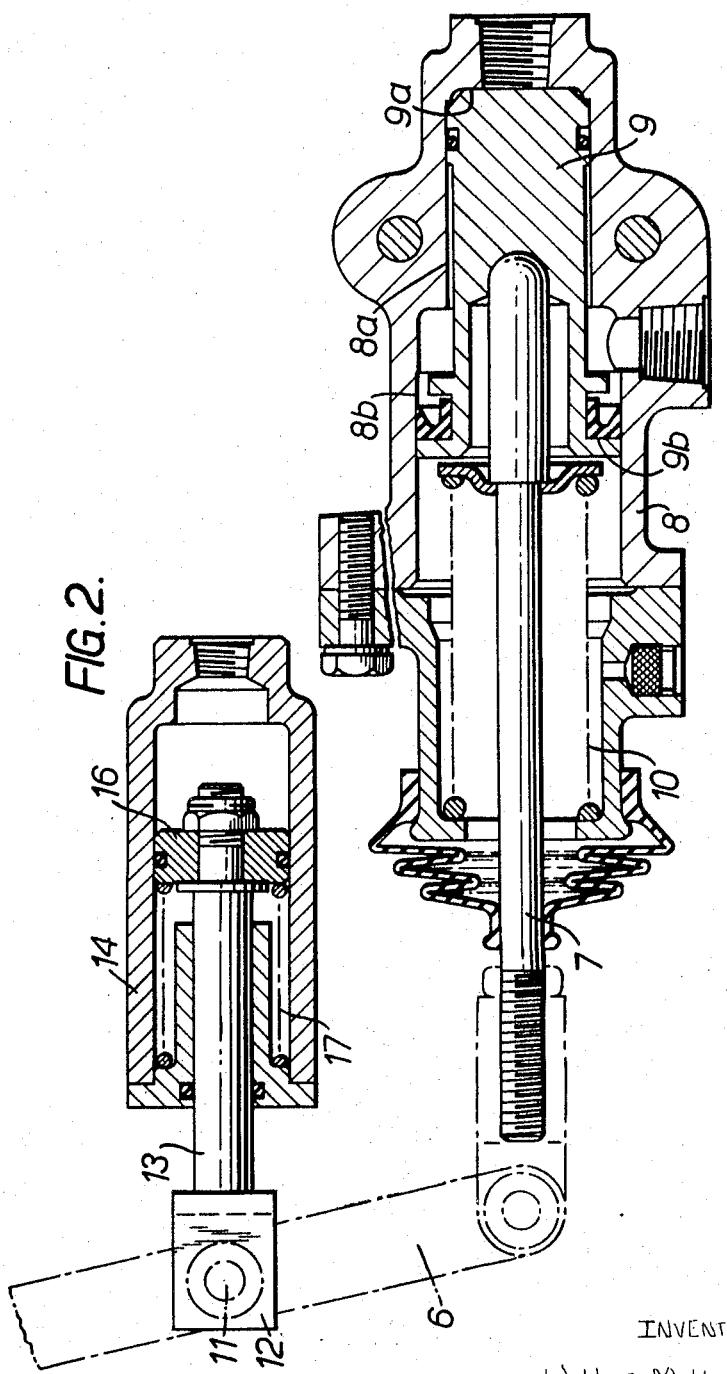
Figure 3:
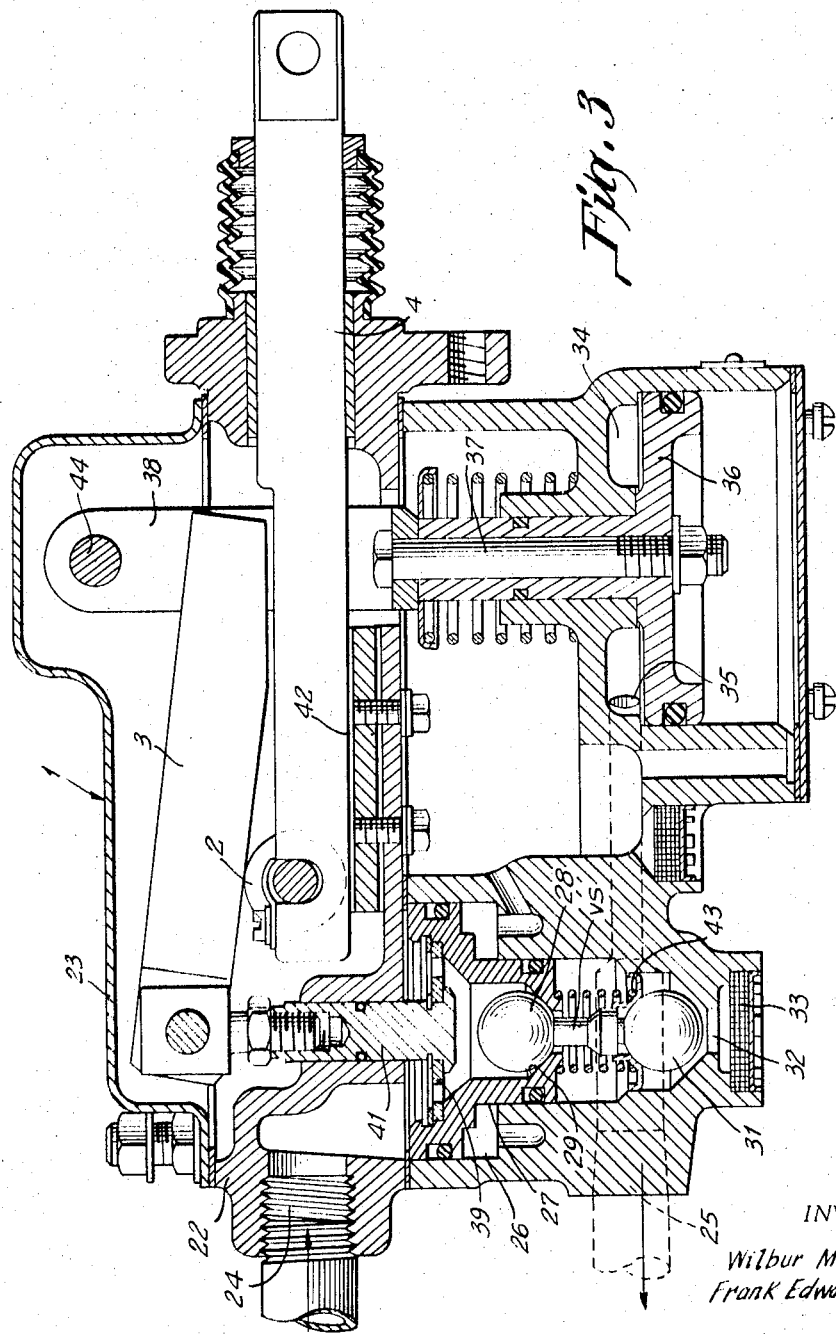

Preferably the chamber of the control cylinder has two sections of differing diameters to receive a stepped piston and which are connected respectively to the suspension system at opposite sides of the vehicle to obtain a more accurate proportioning of braking against vehicle load, and these and other features of the present invention will be more fully understood from the following description of a preferred embodiment thereof, reference being made to the accompanying drawings wherein:

FIG. 1 is a side view of the light/laden valve with the associated cylinder units,
FIG. 2 is a fragmentary view to an enlarged scale showing details of the cylinder units, and
FIGURE 3 is an enlarged view mainly in section showing the structure of the light/laden valve.

In the drawings the light/laden valve 1 is of the same general construction as that disclosed in said Ser. No. 731,773, the roller 2 constituting the fulcrum of the beam 3 being carried on a rod 4 which extends through the end wall of the valve housing and is connected by a link 5 to one end of a double-armed lever 6 the other end of which is connected to the piston rod 7 of the control cylinder 8. As shown in FIGURE 2, the control cylinder has two chamber sections 8a, 8b to receive a stepped piston 9 which has an end face 9a and an annulus 9b of equal area, said chamber sections being adapted to be connected by 20 and 21, respectively, to the levelling valves (not shown) controlling the near and offside suspension units. The two piston surfaces 9a and 9b provide a mean output against a graduated spring 10 resulting in a more accurate proportioning of the braking pressure against vehicle load than is obtained using one suspension unit only as the controlling factor.

The pivot pin 11 for the double-armed lever 6 is carried by a fork member 12 provided on the end of the piston rod 13 of a further or supplementary piston and cylinder type unit 14 adapted to be connected to the reservoir (not shown) of the air suspension system by conduit 15, the piston 16 of said unit being normally held in a limit position by the reservoir pressure against the action of a loading spring 17.

Referring to FIGURE 3, a preferred embodiment of valve 1 comprises a housing 22 closed at its upper side by a removable cover 23 and formed with an inlet port 24 and dual outlet ports or connections 25 by which the valve 1 is connected into a brake line between the manually-operable brake valve 8 and the brake motors in two sections of the braking system, said housing including a stepped chamber 26 which interconnects said ports and in which is located a hollow reciprocable stepped piston 27. Disposed at the lower end of chamber 26 is a dumbbell-shaped valve assembly indicated generally at VS, the upper ball valve element 28 cooperating with an annular seating 29 in the piston 27 while the lower ball valve element 31 cooperates with a seating around an exhaust port 32 opening to atmosphere past a filter 33. A second chamber 34 in the housing on an axis parallel to the chamber 26 is permanently connected at its upper end to the lower end of said chamber 26 by means of a passage 35, a piston 36 in said second chamber being spring-loaded towards the upper end thereof and being fast on a stem 37 secured to a vertically disposed yoke member 38. The hollow piston 27 is attached by a spider 39 to a vertical rod 41 which is guided for reciprocation in the housing and is pivotally attached to one end of the beam 3 the other end of which is located within the opening of the yoke member 38, roller 2 interposed between the underside of the beam at a point intermediate its ends and a fixed surface 42 on the housing constituting the beam pivot or fulcrum.

With the apparatus as so far described and when in the brakes released condition, the piston 27 is at the upper end of its chamber, the upper dumbbell valve element 28 is engaging its seating under the action of a spring 43 and sealing off the inlet or supply connection from the brake valve, while the lower dumbbell valve element 31 is lifted off its seating so connecting both the outlet or delivery ports 25 and the second chamber 34 to exhaust. When pressure is established in the supply line by actuation of the brake valve, the piston 27 and valve assembly VS is moved downwards, first closing the exhaust port 32 and thereafter opening a passage through the piston to interconnect the supply and delivery ports and so effect operation of the brake motors. This movement of the piston 27 rocks the beam 3 about the fulcrum roller 2, sufficient clearance being provided in the yoke member 38 to accommodate the rising of the free end of the beam. An advantageous feature of this construction is that during this operation the beam is free to rotate against "no load," resulting in a low "cracking" load and more rapid and controlled build up of air pressure at the brake cylinders. This feature reduces the hysteresis of the unit as a whole and provides a much improved control in the "light" condition. Simultaneously with the supply of pressure fluid to the brake motors, said fluid is conducted through the passage 35 to the chamber 34 and as pressure builds up over the piston 36, the latter moves downwards to exerting through the cross pin 44 of yoke member 38 a balancing or restoring pressure on the free end of the beam which ultimately moves the beam and the piston 27 to a position to cut off further supply of pressure fluid.

Thus it will be seen that the pressure available at the brake motors, expressed as a percentage of the pressure in the brake or supply line, is determined by the relative areas of the two pistons 27, 36 and the relative lengths of the two arms of the beam, and a feature of the invention is the modification of the relative beam arm lengths according to riding height to proportion the maximum degree of braking possible according to vehicle load. In the preferred arrangement and as shown, the fulcrum roller 2 is carried on the end of control rod 4 guided for axial movement in an end wall of the housing and connected, exteriorly of the housing, to link 5.

During normal operation, the lever pivot 11 is held stationary by reservoir pressure and the stepped piston and cylinder unit 8 acting through the double-armed lever 6 adjusts the position of the beam fulcrum 2 in the light/laden valve in accordance with vehicle load. Should, however, air pressure be lost, the stepped piston 9 will move under the action of the graduated spring 10 to the position normally effecting the minimum degree of braking, but at the same time the supplementary cylinder 14, 16 will compensatively displace the lever pivot 11 in the direction to counteract the action of the control cylinder and cause the light/laden valve to be set to the maximum braking position. This compensative displacement of pivot 11, which takes place to the right in FIGURE 1, shifts roller 2 to the right in FIGURE 1.

We claim:
1. In a braking system for a vehicle having a fluid pressure suspension system connected to a fluid pressure reservoir and a fluid pressure brake control circuit operated by a manual valve, a load responsive control valve in the circuit between the manual valve and the vehicle brakes, and means for automatically regulating the operation of said control valve comprising a first fluid pressure responsive unit operably connected to the suspension system and having motion transmitting mechanism connecting it to said control valve so as to vary the control action in accord with changes in the vehicle load, and a second fluid pressure responsive unit connected to said reservoir independently of said suspension system, said second unit having a movable actuating member operably connected to said mechanism but maintained inactive to actuate said mechanism when the reservoir pressure is above a predetermined value, said actuator member being movable to shift said mechanism to compensatively vary said control action when the reservoir pressure drops, whereby said control valve will be disposed for maximum braking in the circuit upon loss of pressure in said suspension system.

2. In the braking system defined in claim 1, said first control unit comprising a cylinder having a spring biased piston and said mechanism comprising a lever rockable about a pivot device, and said second control unit being connected to said pivot device.

3. In a braking system for a vehicle having a fluid pressure suspension system connected to a fluid pressure reservoir and a fluid pressure brake control circuit operated by a manual valve, a load reponsive control valve in the circuit between the manual valve and the vehicle brakes, and means for automatically regulating the operation of said control valve comprising a first fluid pressure responsive unit operably connected to the suspension system and having mechanism connecting it to said control valve so as to vary the control action in accord with the changes in the vehicle load, and a second fluid pressure responsive unit connected to the suspension reservoir so as to be normally inactive when the reservoir pressure is adequately high, said second control unit comprising a cylinder having a spring biased piston and a piston rod extending from the piston, said mechanism comprising a double armed lever pivotally connected to said piston rod, whereby the control action will be varied when the reservoir pressure drops and said control valve will be disposed for maximum braking in the circuit upon loss of pressure in said suspension system.

4. In a braking system for a vehicle having a fluid pressure suspension system connected to a fluid pressure reservoir in a fluid pressure brake control circuit operated by a manual valve, a load responsive control valve in the circuit between the manual valve and the vehicle brakes, and means for automatically regulating the operation of said control valve comprising a first fluid pressure responsive unit operably connected to the suspension system, said first unit comprising a cylinder having a stepped piston therein, said piston having opposed faces of equal effective areas connected respectively to suspension system pressures at opposite sides of the vehicle, said first unit having mechanism connecting it to said control valve so as to vary the control action in accord with the changes in the vehicle load, and a second fluid pressure responsive unit connected to the suspension reservoir so as to be normally inactive when the reservoir pressure is adequately high, and means connecting said second unit to said mechanism to vary the control action when reservoir pressure drops, whereby said control valve will be disposed for maximum braking in the circuit upon loss of pressure in said suspension system.

References Cited

UNITED STATES PATENTS 2,919,161 12/1959 Hammer _____ 303—22 XR
2,940,796 6/1960 Ortmann et al. _____ 303—22

FERGUS S. MIDDLETON, Primary Examiner

JOHN J. McLAUGHLIN, Jr., Assistant Examiner

U.S. Cl. X.R.

303—48